United States Patent [19]

Nishimura et al.

[11] Patent Number: 4,478,108
[45] Date of Patent: Oct. 23, 1984

[54] CONTROL APPARATUS FOR OIL PRESSURE OPERATED TYPE TRANSMISSION FOR VEHICLE

[75] Inventors: Sadanori Nishimura; Masakazu Maezono, both of Omiya, Japan

[73] Assignee: Honda Giken Kogyo Kabushiki Kaisha, Tokyo, Japan

[21] Appl. No.: 399,220

[22] Filed: Jul. 19, 1982

[30] Foreign Application Priority Data

Jul. 17, 1981 [JP] Japan .............................. 56-110866

[51] Int. Cl.³ .............................................. B60K 41/08
[52] U.S. Cl. ........................................ 74/866; 74/867; 74/871; 74/878
[58] Field of Search ............... 192/0.076; 74/856, 861, 74/865, 866, 867, 870, 871, 878

[56] References Cited

FOREIGN PATENT DOCUMENTS

| 63046 | 5/1980 | Japan | 74/867 |
| 39348 | 4/1981 | Japan | 74/865 |
| 76750 | 6/1981 | Japan | 74/865 |

OTHER PUBLICATIONS

Japanesse Unexamined U.M. Application SHO 54-139171.

Primary Examiner—George H. Krizmanich
Assistant Examiner—M. Manley
Attorney, Agent, or Firm—Armstrong, Nikaido, Marmelstein & Kubovcik

[57] ABSTRACT

A control apparatus for a vehicle transmission is provided which has at least two transmission trains, which includes a high speed transmission train and a low speed transmission train. The low speed transmission train includes a one-way clutch. Each of the transmission trains have a clutch therein. The control apparatus comprises a hydraulic circuit coupled to the clutch and a creep-preventer which is coupled to the hydraulic circuit for operating in response to the idling of the vehicle engine when the vehicle is stopped, and to make the one-way clutch inoperative to prevent transmission of power through the low speed transmission when the clutch of the high speed transmission is engaged, to thereby permit operation of the clutch of the low speed transmission train without the transmission of power therethrough.

5 Claims, 2 Drawing Figures

CONTROL APPARATUS FOR OIL PRESSURE OPERATED TYPE TRANSMISSION FOR VEHICLE

BACKGROUND OF THE INVENTION

1. Field of the Invention

This invention relates to a control apparatus for an oil-pressure operated type transmission for a vehicle and, more particularly, to a transmission connected through a torque converter to an internal combustion engine. The transmission has at least two transmission trains of high speed and low speed, each having oil-pressure operated type engaging elements, such as oil-pressure operated type clutches or the like interposed therein and the low speed transmission train is provided with a one-way clutch interposed therein. The control apparatus further includes a creep-preventing means.

2. Description of the Prior Art

In general, in a two-stage transmission having oil-pressure operated clutches, a one-way clutch effectively absorbs a change speed shock at the time of up-shifting from the low speed stage. However, at the time of stopping of a vehicle, if idling operation is effected without returning the shift lever to the neutral position, the low speed transmission train is established regardless of the existence or nonexistence of the one-way clutch and the engine torque is transmitted therethrough to driving wheels of the vehicle to cause a creep phenomenon in which the vehicle moves.

For preventing this creep phenomenon, there has been hitherto proposed an arrangement in which a creep-preventing means is operated when an idling operation of the engine, under a vehicle stop condition, is detected so that oil is supplied to cut off the low speed engaging element in the low speed transmission train and automatically return the transmission to its neutral stage. Upon a vehicle starting operation with the accelerator pedal being pushed down, the oil supply to that element is resumed to automatically shift from the neutral stage to the low speed stage. (Japanese Unexamined U.M. Application No. SHO 54-139171). This prior art arrangement, however, is inconvenient in that rapid revving of the engine is caused by a time lag between the time of pushing-down of the accelerator pedal and the time of establishment of the low speed transmission train, and a rapid starting of the vehicle by the establishment of the transmission train with a high speed results in unsmooth vehicle starting.

SUMMARY OF THE INVENTION

It is the primary object of the present invention to provide a control apparatus for a multispeed vehicle transmission which has a creep-preventing device.

It is a further object of the present invention to provide a control apparatus for a multispeed transmission which prevents creeping and provides for smooth starting of a vehicle.

The present invention is directed to a control apparatus for a vehicle transmission having at least two speeds. The transmission has at least one high speed transmission train and one low speed transmission train, which includes a one-way clutch. Each of the transmission trains includes a hydraulic clutch. The control apparatus comprises a hydraulic circuit coupled to each of the hydraulic clutches and creep-preventing means for operating in response to idling of the vehicle engine when the vehicle is stopped to make the clutch of the high speed transmission engaged. The clutch of the low speed transmission is engaged during idling and stopping, but power is not transmitted therethrough by the function of the one-way clutch interposed therein. However, upon actuation of the vehicle accelerator, the one-way clutch becomes operative and the low speed transmission train transmits power.

DETAILED DESCRIPTION OF THE PREFERRED EMBODIMENT

Figure 1:
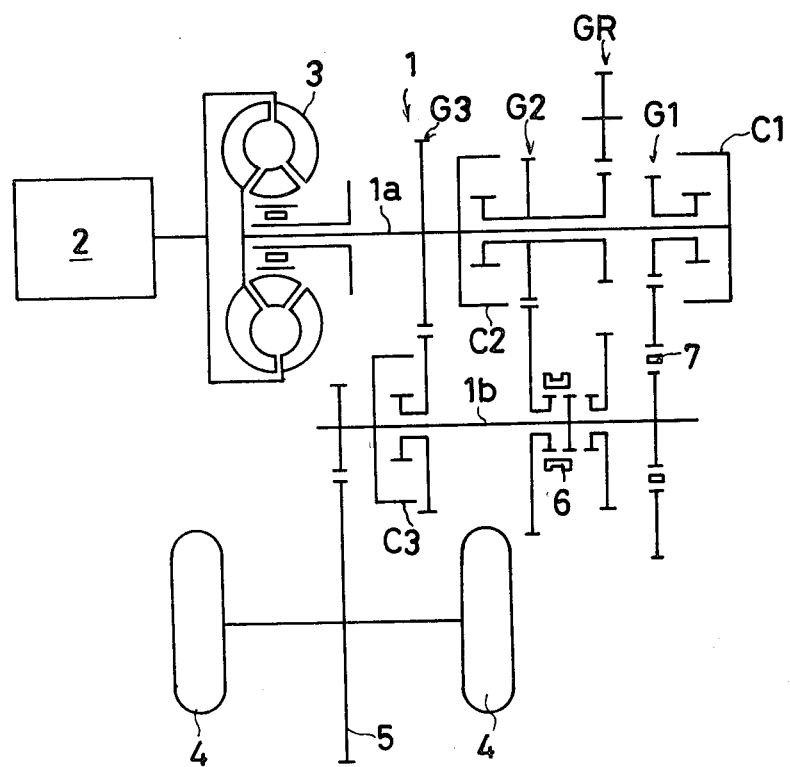
FIG. 1 is a schematic diagram of a transmission with which the present invention is used.

Referring to the drawings, the transmission 1 has an input shaft 1a connected to an internal combustion engine 2 through a torque converter 3, and an output shaft 1b is connected to driving wheels 4 of a vehicle through a differential gear 5. Transmission trains G1, G2, G3, GR of three forward stages and one reverse stage are coupled between the two shafts 1a, 1b. A 1st speed oil pressure operated clutch C1 on the input shaft 1a functions as an oil pressure operated engaging element coupled in the 1st speed transmission train G1 of the forward low speed stage, a 2nd speed oil pressure operated clutch C2 on the input shaft 1a is coupled in the 2nd speed transmission train G2 of the middle speed stage, and a 3rd speed oil pressure operated clutch C3 on the output shaft 1b is coupled in a 3rd speed transmission train G3 of the forward high speed stage. Additionally, the 2nd speed oil pressure operated clutch C2 is also coupled in the reverse driving transmission train GR so that the two transmission trains GR, G2 may be selectively connected to the output shaft 1b by a selector gear 6 movable between the forward driving side towards the left and the reverse driving side towards the right as viewed in FIG. 1.

A one-way clutch 7 is coupled in the 1st speed transmission train G1 and, as will be explained hereinafter, the one-way clutch 7 which is, for instance, a ball type or roller type overrunning clutch, is arranged to absorb a change speed shock at the time of shifting-up from the 1st speed to the 2nd speed as explained hereinafter.

Figure 2:
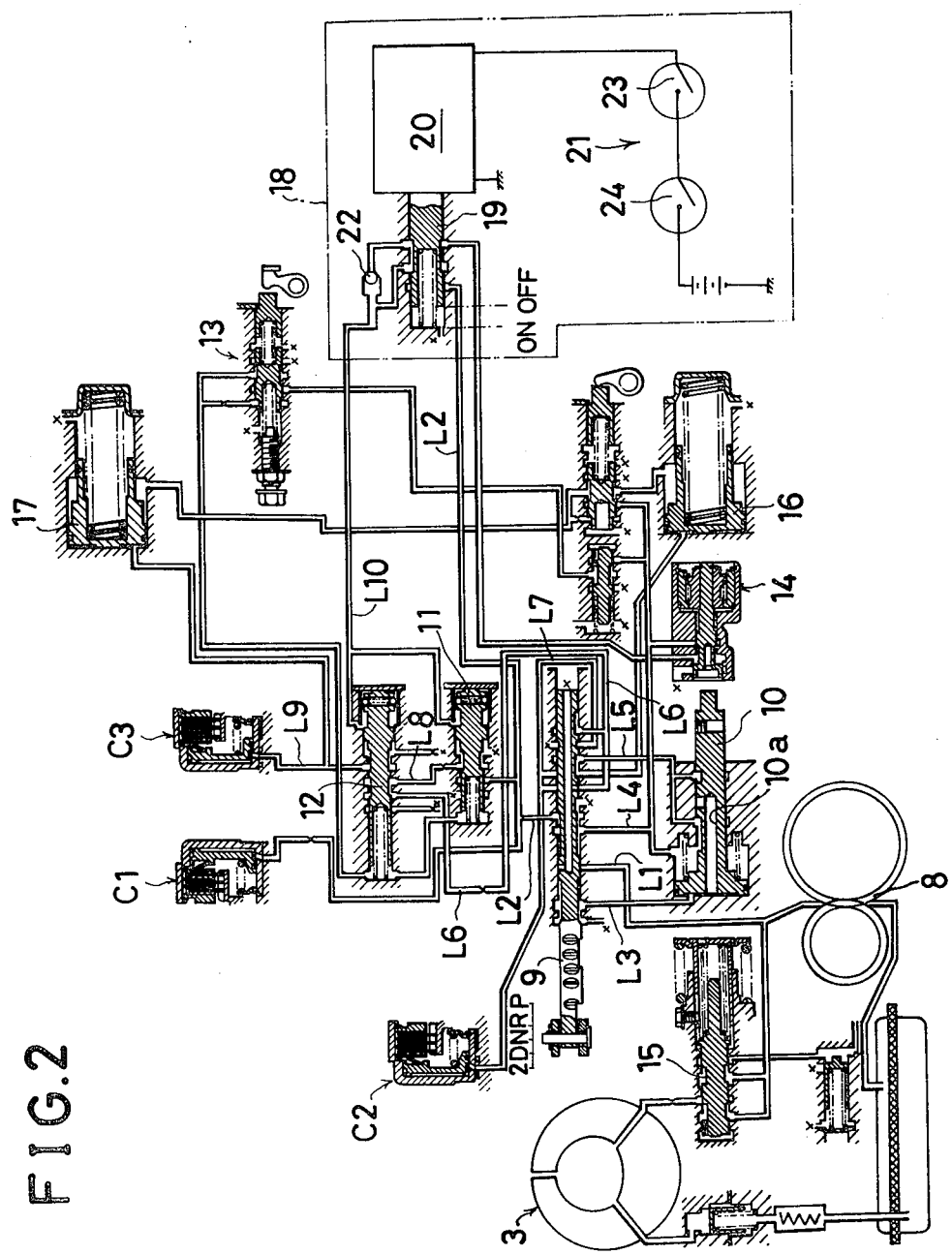
FIG. 2 is a circuit diagram of the preferred embodiment of the present invention.

The oil pressure operated clutches C1, C2, C3 and the selector gear 6 are arranged to be controlled in operation by an oil pressure circuit shown in FIG. 2. The circuit comprises an oil pressure source 8 arranged to be driven by the engine 2 and a manual valve 9, which can be shifted by a shift lever, not illustrated, to any of the five positions of "P" for parking, "R" for reverse, "N" for neutral, "D" for automatic change speed and "2" for 2nd speed holding. A servo-valve 10, for changeover between forward driving and reverse driving, is connected to the selector gear 6 and 1st and 2nd shift valves 11, 12 are provided for effecting the automatic change speed.

The manual valve 9 is arranged to be brought into respective communications with a 1st oil passage L1 connected to the oil-pressure source 8, a 2nd oil passage L2 connected to the 1st speed oil-pressure operated clutch C1 and the 1st shift valve 11, a pair of 3rd and 4th oil passage L3, L4 connected to the servo-valve 10 and located on the upstream side thereof, a 5th oil passage L5 connected to the valve 10 and located on the downstream side thereof, a 6th oil passage L6 connected to the 2nd shift valve 12 and located on the downstream side thereof, and a 7th oil passage L7 connected to the 2nd speed oil-pressure operated clutch C2. Thus, if the manual valve 9 is shifted from the illustrated "N" position to the rightward "R" position, the 1st oil passage L1 and the 3rd oil passage L3 are interconnected and the 5th oil passage L5 and the 7th oil passage L7 are interconnected, respectively, so that, by oil being supplied to the 3rd oil passage L3, the servo-valve 10 is moved to the rightward reverse driving position against the action of a spring force, resulting in a changeover operation of the selector gear 6 to the reverse driving side. Additionally, there is communication between the 3rd oil passage L3 and the 5th oil passage L5 through an oil opening 10a made in the servo-valve 10. Thereby the 2nd speed oil pressure operated clutch C2 is supplied with oil through the 1st oil passage L1, the 3rd oil passage L3, with 5th oil passage L5 and the 7th oil passage L7, whereby there is established the reverse driving transmission train GR.

If the manual valve 9 is shifted from the "N" position to the leftward "D" position, the 1st oil passage L1 is connected to the 2nd and 4th oil passages L2, L4 and the 6th oil passage L6 is connected to the 7th oil passage L7 and, by operation of the 1st and 2nd shift valves 11, 12, the 1st speed to 3rd speed oil-pressure operated clutches C1, C2, C3 are in sequence supplied with oil for establishing the respective speed transmission trains G1, G2, G3 in sequence. If the manual valve 9 is shifted from the "D" position to the "2" position, the 1st oil passage L1 and the 4th oil passage L4 are interconnected and the 5th oil passage L5 and the 7th oil passage L7 are interconnected, respectively. The servo-valve 10 is already in its forward driving position as a result of the spring pressure, and thereby there is a changeover operation of the selector gear 6 to the forward driving side and a connection between the 4th oil passage L4 and the 5th oil passage L5, whereby the 2nd speed transmission train G2 is established by the oil supply to the 2nd speed oil pressure operated clutch C2.

The 1st and 2nd shift valves 11 and 12 are interconnected through an intermediate 8th oil passage L8 and the 1st shift valve 11 is movable between its illustrated low speed position wherein the connection between the 2nd oil passage L2 and the 8th oil passage L8 is cut off and its leftward high speed position (not shown) wherein the two oil passages L2 and L8 are interconnected. The 2nd shift valve 12 is movable between its illustrated low speed position wherein the 8th oil passage L8 and the 6th oil passage L6 are interconnected and its left hand high speed position (not shown) wherein the interconnection of the oil passage L8, L6 is cut off and the 8th oil passage L8 is connected to the 9th oil passage L9 connected to the 3rd speed oil-pressure operated clutch C3. The 1st and 2nd shift valves 11 and 12 are biased to the low speed positions thereof by respective spring forces, and the left ends and the right ends of the two valves 11 and 12 are applied with a throttle pressure corresponding to a throttle open degree received from a throttle valve 13 connected to a split passage of the 4th oil passage L4 and a governor pressure corresponding to a vehicle speed supplied from a governor valve 14. Thus, if the governor pressure is increased, first the 1st shift valve 11 is moved to its high speed position and then the 2nd shift valve 12 is moved to its high speed position.

If the manual valve 9 is in the "D" position, first, the 1st speed oil-pressure operated clutch C1 is supplied with oil through the 2nd oil passage L2 connected to the 1st oil passage L1 as described above. Thereby a vehicle is driven through the 1st speed transmission train G1. Then, by an increase in the governor pressure according to an acceleration of the vehicle, the 1st shift valve 11 is moved to the high speed position and, consequently, the 2nd speed oil-pressure operated clutch C2 is supplied with oil through the 2nd oil passage L2, the 8th oil passage L8, the 6th oil passage L6 and the 7th oil passage L7, whereby the vehicle is driven through the 2nd speed transmission train G2. If the vehicle speed is further increased, the 2nd shift valve 12 is moved to the high speed position and the 3rd speed oil pressure operated clutch C3 is supplied with oil through the 8th oil passage L8 and the 9th oil passage L9, whereby the vehicle is driven through the 3rd speed transmission train G3.

During these operations, the 1st speed oil-pressure operated clutch C1 is always supplied with oil, but because the one-way clutch is interposed in the 1st speed transmission train G1 as described above, when the 2nd speed transmission train G2 or the 3rd speed transmission train G3 are established, there is no power transmission through the 1st speed transmission train G1. Upon upshifting from the 1st speed to the 2nd speed, when the rotation speed of the output shaft 1b becomes above that caused by the 1st speed transmission train G1, the one-way clutch 7 makes the 1st speed transmission train G1 inoperative automatically whereby it functions effectively to make a smooth speed change without causing any change speed shock, from the 1st speed transmission train G1 to the 2nd speed transmission train G2.

A regulator valve 15 supplies pressure oil from the 1st oil passage L1 divergingly to the torque converter 3 and regulates the line pressure of the 1st oil passage L1 to that corresponding to a stator reaction force of the torque converter 3. Accumulators 16 and 17 are also included in the hydraulic circuit.

If, with the oil pressure circuit arrangement as described above, the manual valve 9 is in the "D" position, the 1st oil passage L1 and the second oil passage L2 are in communication with one another as described above, even when the vehicle is stopped and, on an idling operation of the engine, the engine torque is transmitted to the driving wheels 4 of the vehicle through the 1st speed transmission train G1 caused by oil supplied to the 1st speed oil pressure operated clutch C1. This results in a creep phenomenon.

As a countermeasure, there has been hitherto, as mentioned before, a proposal to provide a creep-preventing means arranged to be operated when the idling operation of the engine under the vehicle stopped condition is detected so that, by the operation of the preventing means, the oil supply to the 1st speed oil pressure operated clutch C1 is cut off to make the 1st speed transmission train G1 inoperative. Such a proposed arrangement, however, is inconvenient in that there is revving of the engine or a sudden starting of the vehicle as mentioned above. According to the present invention, the one-way clutch 7 interposed in the 1st speed transmission train G1 is arranged so that the 3rd speed oil pressure operated clutch C3 is supplied with oil to establish the 3rd speed transmission train G3 while the oil supply to the 1st speed oil pressure operated clutch C1 is continued, whereby the 1st speed transmission C1 is inoperative by the function of the one-way clutch 7.

A creep-preventing means 18 comprises a control valve 19 which connects and disconnects the 2nd oil passage L2 and the 10th oil passage L10 for applying the governor pressure from the governor valve 14 to the right ends of the 1st and 2nd shift valves 11 and 12. A switch means 21 controls an electric power supply to a solenoid 20 for the valve 19. The control valve 19 functions such that it is normally biased to its rightward inoperative position by the resilient pressure of a spring to cut off a communication between the 2nd oil passage L2 and the 10th oil passage L10. But if the solenoid 20 is energized, it is moved to its leftward operative position to make the communication between the two oil passages L2 and L10, so that the line pressure is applied to the right ends of the 1st and 2nd shift valves 11 and 12 to move the two valves 11 and 12 to their high speed positions, whereby oil is supplied to the 3rd speed oil-pressure operated clutch C3 through the 2nd oil passage L2, the 8th oil passage L8 and the 9th oil passage L9. A one-way valve 22 is provided for preventing a reverse flow of the line pressure towards the governor valve 14 side.

A modification can be made in which the plungers are provided at the right end positions of the 1st and 2nd shift valves 11 and 12 and a line pressure is applied to the respective valves 11 and 12 through those plungers from an oil passage other than the 10th oil passage L10. In this case, the control valve 19 is interposed in that oil passage for opening and closing the same.

The switch means includes a 1st switch 23 which is closed upon detecting a vehicle stop condition and a 2nd switch 24 which is closed upon detecting an idling operation of the engine, such as the idle position of the acceleration pedal, for instance. The switches 23 and 24 are coupled in series in an electric power circuit for the solenoid 20 such that, upon idling of the engine under a vehicle stop condition, the solenoid 20 is energized by closing the two switches 23 and 24.

It is difficult in practice to detect only the stop condition of a vehicle and, therefore, the 1st switch 23 is arranged to be closed when the vehicle speed falls below 5Km/h, for example. Also, the 1st switch 23 can be arranged to be closed when the engine speed corresponding to the foregoing vehicle speed at the 1st speed stage falls below 1000 rpm, for example.

Next, the operation of the apparatus will be explained as follows:

If the engine 2 is idling when the vehicle is stopped with the manual valve 9 in the "D" position, the 1st and 2nd switches 23 and 24 are closed and there is a movement of the control valve 19 to its operative position by the energization of the solenoid 20. By such an operation of the creep-preventing means 18, there is effected an oil supply to the 3rd speed oil-pressure operated clutch C3.

The 1st speed oil-pressure operated clutch C1 is continuously supplied with oil through the 2nd oil passage L2 but, by the establishment of the 3rd speed transmission train G3 caused by the oil supply to the 3rd speed oil pressure operated clutch C3, the 1st speed transmission train G1 is inoperative because the one-way clutch 7 is interposed therein. In this case, the output torque of the engine is transmitted to the driving wheels 4 through the 3rd speed transmission train G3, but this torque is extremely small and the creep phenomenon is substantially lower than that caused through the 1st speed transmission train G1.

If then, the vehicle is started by pressing down of the acceleration pedal, the 2nd switch 24 is opened to cut off the electric power supply to the solenoid 20 and the control valve 19 is returned to its inoperative position and the operation of the creep-preventing means 18 is released.

By the release of the operation thereof, the oil supply to the 3rd speed oil-pressure operated clutch C3 is cut off but the oil supply to the first speed oil-pressure operated clutch C1 is continued. Accordingly, simultaneously with that, the 3rd speed transmission train G3 being made inoperative by the oil discharge from the 3rd speed oil-pressure operated clutch C3, the 1st speed transmission train G1 is established. Thereby a smooth vehicle starting is effected without causing a revving up of the engine 2.

The above is related to a transmission with three forward speeds, but this invention is not limited thereto but can be applied to a transmission with four forward speeds. In this case, the creep-preventing means is so constructed that, by the operation thereof, the 3rd speed or the 4th speed oil-pressure operated clutch may be supplied with oil. Though there has been explained in the foregoing example a transmission in which the oil pressure operated clutch is used as the oil pressure operated engaging element, this invention can also be applicable to an oil pressure brake or the like used as the oil pressure operated engaging element in a planetary gear mechanism type transmission.

Thus, according to this invention, the operation of the creep-preventing means, with the oil supply to the low speed oil-pressure engaging element being continued, the high speed oil-pressure engaging element is supplied with oil to establish the high speed transmission train, and the low speed transmission train, even though having oil supplied thereto, is made inoperative by the function of a one-way clutch interposed therein. Thus, the creep phenomenon can be remarkably decreased as compared with the case in which the low speed transmission train remains established. In addition, the oil is supplied to the low speed oil pressure operated engaging element prior to the time of release of the operation of the creep-preventing means at the starting of the vehicle, so that the low speed transmission train can be established at the same time of the high speed transmission train becoming inoperative. Thus, there is no time lag during that time and a revving up of the engine can be prevented and, accordingly, smooth vehicle starting can be obtained.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims rather than the foregoing description, and all changes which come within the meaning and range of equivalency of the claims are, therefore, to be embraced therein.

What is claimed is:

1. A control apparatus for a vehicle of the type having an oil pressure source, an engine and a transmission having at least two transmission trains including a high speed transmission train and a low speed transmission train, said low speed transmission train including a one-way clutch means wherein said low speed transmission train is selectively disengaged during the operation of said high speed transmission train, each of said transmission trains having an oil pressure operated clutch means therein, said control apparatus comprising creep-preventing hydraulic circuit means having a first passage connecting the source and the low speed clutch means, a second passage connecting the source and the high speed clutch means, a shift valve for opening and closing the second passage in accordance with the vehicle speed, a third passage connecting the source and the shift valve, and a control valve for opening the third passage under an engine idling condition at the time the vehicle stops, so that the source is selectively coupled to said high and low speed clutch means and the creep-preventing hydraulic circuit means for operating said high speed clutch means in response to the idling of the vehicle engine when the vehicle is stopped, such that said creep-preventing hydraulic circuit means engages said high and low speed clutch means of said high and low speed transmission trains, whereby said one-way clutch is disengaged; and wherein, when the vehicle starts accelerating, said creep-preventing hydraulic circuit means operates to disengage said high speed clutch means, whereby said one-way clutch is engaged to transmit power from the engine through said low speed transmission train.

2. A control apparatus as set forth in claim 1, wherein said clutch means are oil-pressure operated clutch means.

3. A control apparatus as set forth in claim 1, wherein said creep-preventing means comprises a control valve means coupled to said hydraulic circuit means, solenoid means for operating said control valve means and switch means for energizing said solenoid means.

4. A control apparatus as set forth in claim 3, wherein said switch means comprises first and second switches connected in series, said first switch being closed in response to the stopping of the vehicle and said second switch being closed in response to the idling of the engine of the vehicle.

5. A control apparatus for a vehicle of the type that is provided with transmission means, including drive means adapted to drive the vehicle from a stop to higher speeds, a first oil pressure source, and an engine adapted to be connected to the drive means at idling and higher engine speeds by the transmission means, said transmission means having at least two transmission trains including a high speed transmission train and a low speed transmission train, said low speed transmission train including a one-way clutch means wherein said low speed transmission train is selectively disengaged during the operation of said high speed transmission train, each of said transmission trains having an oil pressure operated clutch means therein, said control apparatus, comprising creep-preventing hydraulic circuit means having at least a first passage connecting the first oil pressure source and the low speed clutch means, a second passage connecting the first oil pressure source and the high speed clutch means, a shift valve for opening and closing the second passage, governor means having a valve for generating a second source of oil pressure corresponding to the vehicle speed, a third passage for the second source of oil pressure, a fourth passage connected to the first oil pressure source, a fifth passage connected to the shift valve, and a control valve positioned between the third, fourth and fifth passages and arranged to connect the third and the fifth passages in an ordinary case and the fourth and fifth passages under an engine idling condition at the time the vehicle stops so that the first and second oil pressure sources are selectively coupled to said high and low speed clutch means and the creep-preventing hydraulic means for operating said high speed clutch means in response to the idling of the vehicle engine when the vehicle is stopped, such that said creep-preventing hydraulic circuit means engages said high and low speed clutch means of said high and low speed transmission trains, whereby said one-way clutch is disengaged; and wherein, when the vehicle starts accelerating, said creep-preventing hydraulic circuit means operates to disengage said high speed clutch means, whereby said one-way clutch is engaged to transmit power from the engine to the drive means through said low speed transmission train.

* * * * *